United States Patent
Kumar et al.

(10) Patent No.: US 7,085,279 B1
(45) Date of Patent: Aug. 1, 2006

(54) METHOD AND APPARATUS FOR CARRYING TELEPHONY NETWORK TRAFFIC OVER AN ATM NETWORK

(75) Inventors: Rajesh Kumar, Fremont, CA (US); Snehal Karia, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 885 days.

(21) Appl. No.: 09/752,075

(22) Filed: Dec. 29, 2000

(51) Int. Cl.
*H04L 12/56* (2006.01)

(52) U.S. Cl. .................. 370/401; 370/352; 370/395.5; 370/496; 379/229

(58) Field of Classification Search ................ 370/401, 370/395.5, 352, 442, 400, 396, 522, 260; 379/229–240
See application file for complete search history.

(56) References Cited

U.S. PATENT DOCUMENTS

| | | | |
|---|---|---|---|
| 5,974,048 A | 10/1999 | Godse et al. | |
| 5,978,376 A | 11/1999 | Godse et al. | |
| 6,115,825 A | 9/2000 | Laforge et al. | |
| 6,195,714 B1* | 2/2001 | Li et al. | 710/31 |
| 6,233,223 B1 | 5/2001 | Sabry et al. | |
| 6,381,232 B1 | 4/2002 | Strawczynski et al. | |
| 6,421,674 B1 | 7/2002 | Yoakum et al. | |
| 6,570,869 B1* | 5/2003 | Shankar et al. | 370/352 |
| 6,614,781 B1* | 9/2003 | Elliott et al. | 370/352 |
| 6,640,284 B1 | 10/2003 | Shaw et al. | |
| 6,701,366 B1 | 3/2004 | Kallas et al. | |
| 6,714,987 B1 | 3/2004 | Amin et al. | |
| 6,721,322 B1* | 4/2004 | Lakhani et al. | 370/352 |
| 6,724,747 B1* | 4/2004 | Arango et al. | 370/352 |
| 6,735,621 B1 | 5/2004 | Yoakum et al. | |
| 6,742,042 B1 | 5/2004 | Holden et al. | |

(Continued)

OTHER PUBLICATIONS

Ramnath A. Lakshmi-Ratan, "The Lucent Technologies Softswitch— Realizing the Promise of Convergence", Bell Labs Technical Journal, Apr.-Jun. 1999, pps. 174-195.*

(Continued)

*Primary Examiner*—Brian Nguyen
*Assistant Examiner*—Tri H. Phan
(74) *Attorney, Agent, or Firm*—Blakely, Sokoloff, Taylor & Zafman, LLP

(57) ABSTRACT

A method that sends ATM source identification and an ATM-TDM correlation tag from an ATM source gateway to a telephony signaling control network; and then receives at an ATM destination gateway the ATM source identification and the ATM-TDM correlation tag as sent from the telephony signaling control network; and then sends the ATM-TDM correlation tag from the ATM destination gateway to the ATM source gateway to establish a connection between the ATM destination gateway and the ATM source gateway.

20 Claims, 3 Drawing Sheets

U.S. PATENT DOCUMENTS

| | | |
|---|---|---|
| 6,757,732 B1 | 6/2004 | Sollee et al. |
| 6,765,921 B1 | 7/2004 | Stacey et al. |
| 6,771,639 B1 | 8/2004 | Holden |
| 6,778,653 B1 | 8/2004 | Kallas et al. |
| 6,807,173 B1 | 10/2004 | Lee et al. |
| 6,819,678 B1 * | 11/2004 | Sylvain .................. 370/466 |
| 6,832,254 B1 | 12/2004 | Scoggins et al. |
| 6,845,389 B1 | 1/2005 | Sen et al. |
| 6,867,797 B1 | 3/2005 | Pound |
| 6,870,817 B1 | 3/2005 | Dolinar et al. |
| 6,870,848 B1 | 3/2005 | Prokop |
| 6,882,643 B1 * | 4/2005 | Mauger et al. ............ 370/389 |
| 6,885,658 B1 | 4/2005 | Ress et al. |
| 2002/0080791 A1 * | 6/2002 | Sylvain .................. 370/394 |

OTHER PUBLICATIONS

M. Handley, et al., "RFC 2327-SDP: Session Description Protocol," ISI/LBNL, Apr. 1998, pp. 1-32, The Internet Society, http://www.faqs.org/rfcs/rfc2327.html.

M. Handley, et al., "SDP: Session Description Protocol," ISI/BNL, Apr. 1998, pp. 1-33, The Internet Society, http://asg.web.cmu.edu/rfc2327.html.

Nortel Networks, "The role of Megaco/H.248 in media gateway control: A protocol standards overview," White Paper (dated Dec. 2000).

* cited by examiner

METHOD AND APPARATUS FOR CARRYING TELEPHONY NETWORK TRAFFIC OVER AN ATM NETWORK

FIELD OF THE INVENTION

The field of invention relates to networking, generally; and more specifically, to carrying telephony traffic over an ATM network.

BACKGROUND

FIG. 1 shows an example of a traditional approach for carrying telephony traffic. Telephony traffic is traditionally carried over a telephony network 103. As is known in the art, a telephony network 103 employs: 1) circuit switching to set up a connection; and 2) time division multiplexing (TDM) to transport information over the connection. Some examples of a telephony network include a Public Switched Telephone Network (PSTN) or an Integrated Services Data Network (ISDN).

Telephony traffic is traffic traditionally carried by a telephony network such as voice traffic and facsimile (FAX) traffic. In the example of FIG. 1, telephony traffic is carried by the telephony network 103 from a source device 101 (e.g., a telephone mouthpiece or transmitting FAX modulator) to a destination device 102 (e.g., a telephone earpiece or receiving FAX demodulator).

Note that, as an example, both the source device 101 and the destination device 102 are coupled to a corresponding local exchange or end office 180, 181 (LE/EO). A local exchange typically handles traffic from a smaller geographic region while a central exchange typically handles traffic from a larger geographic region. Because either may apply to the exemplary depiction of FIG. 1, the notation LE/EO 180, 181 has been used.

The source device 101 is coupled to LE/EO 180 (which may also be referred to as the source LE/EO 180) and the destination device 102 is coupled to LE/EO 181 (which may also be referred to as the destination LE/EO 181). An LE/EO, such as source LE/EO 180, provides for the efficient collection of information from different source devices. That is, traffic entering the telephony network 103 (e.g., from a plurality of different telephone mouthpieces and/or transmitting FAX modulators) may be combined at a LE/EO 180 and transported further upstream (i.e., deeper into the telephony network 103) over a single trunk line 113 (e.g., a T1 line).

Similarly, a LE/EO such as destination LE/EO 181 also provides efficient distribution of information to different destination devices. That is, traffic leaving the telephony network 103 (e.g., toward a plurality of different telephone earpieces and/or receiving FAX demodulators) may be collectively received at a LE/EO from a single trunk line 118 (that is coupled to deeper regions of the telephony network 103) and then distributed from the LE/EO to the appropriate destination devices.

For any connection carried by the telephony network 103, the connection's establishment (e.g., call setup and teardown procedures) and routing path are controlled by a telephony signaling control network 104. An example of a telephony signaling control network 104 is a Signaling System 7 (SS7) network. SS7 networks, which include local and national variants, are implemented world-wide.

As an example, when an individual at the source device 101 attempts to call an individual at the destination device 102, the information indicative of the source and destination devices (e.g., an Initial Address Message (IAM) message) is typically forwarded from the source LE/EO 180 to a signaling transfer point (STP) 105 within the telephony signaling control network 104. The STP 105 (which may also be referred to as the "source" STP 105) helps arrange notification of the call to STP 106 (which may also be referred to as the "destination" STP 106) responsible for the destination LE/OE 181.

Upon such notification, the destination STP 106 will forward the IAM message to the destination LE/EO 181. The destination LE/OE will then notify the destination device 102 of the call (e.g., via a "RING" signal). The destination LE/EO 181 is also informed, from the telephony signaling control network 104, which TDM time slot on trunk line 118 that the information from the call is to be sent along. Generally, when multiple switches (i.e., more than two) are used to carry a call, a switch communicates the TDM time slot and trunk line (through the telephony signaling control network 104) to the next switch used to carry the call.

A problem with telephony networks is their inherent emphasis on the transportation of telephony traffic. With the growth of the Internet, service demand for the transportation of data traffic (e.g., traffic between computing devices such as e-mails, HTML files, etc. exchanged between computers) has sharply risen. Unfortunately, the TDM approach employed by a telephony network is a networking architecture that is particularly tailored for the carrying of voice conversations. As a result, a telephony network does not efficiently handle the transportation of both voice and data traffic.

SUMMARY OF INVENTION

A method is described that sends ATM source identification and an ATM-TDM correlation tag from an ATM source gateway to a telephony signaling control network. At an ATM destination gateway, the ATM source identification and the ATM-TDM correlation tag are received after being sent from the telephony signaling control network. The ATM-TDM correlation tag is then sent from the ATM destination gateway to the ATM source gateway to establish a connection between the ATM destination gateway and the ATM source gateway.

BRIEF DESCRIPTION OF THE DRAWINGS

The present invention is illustrated by way of example, and not limitation, in the Figures of the accompanying drawings in which.

DETAILED DESCRIPTION

A method is described that sends ATM source identification and an ATM-TDM correlation tag from an ATM source gateway to a telephony signaling control network. At an ATM destination gateway, the ATM source identification and the ATM-TDM correlation tag are received after being sent from the telephony signaling control network. The ATM-TDM correlation tag is then sent from the ATM destination gateway to the ATM source gateway to establish a connection between the ATM destination gateway and the ATM source gateway.

Figure 2:
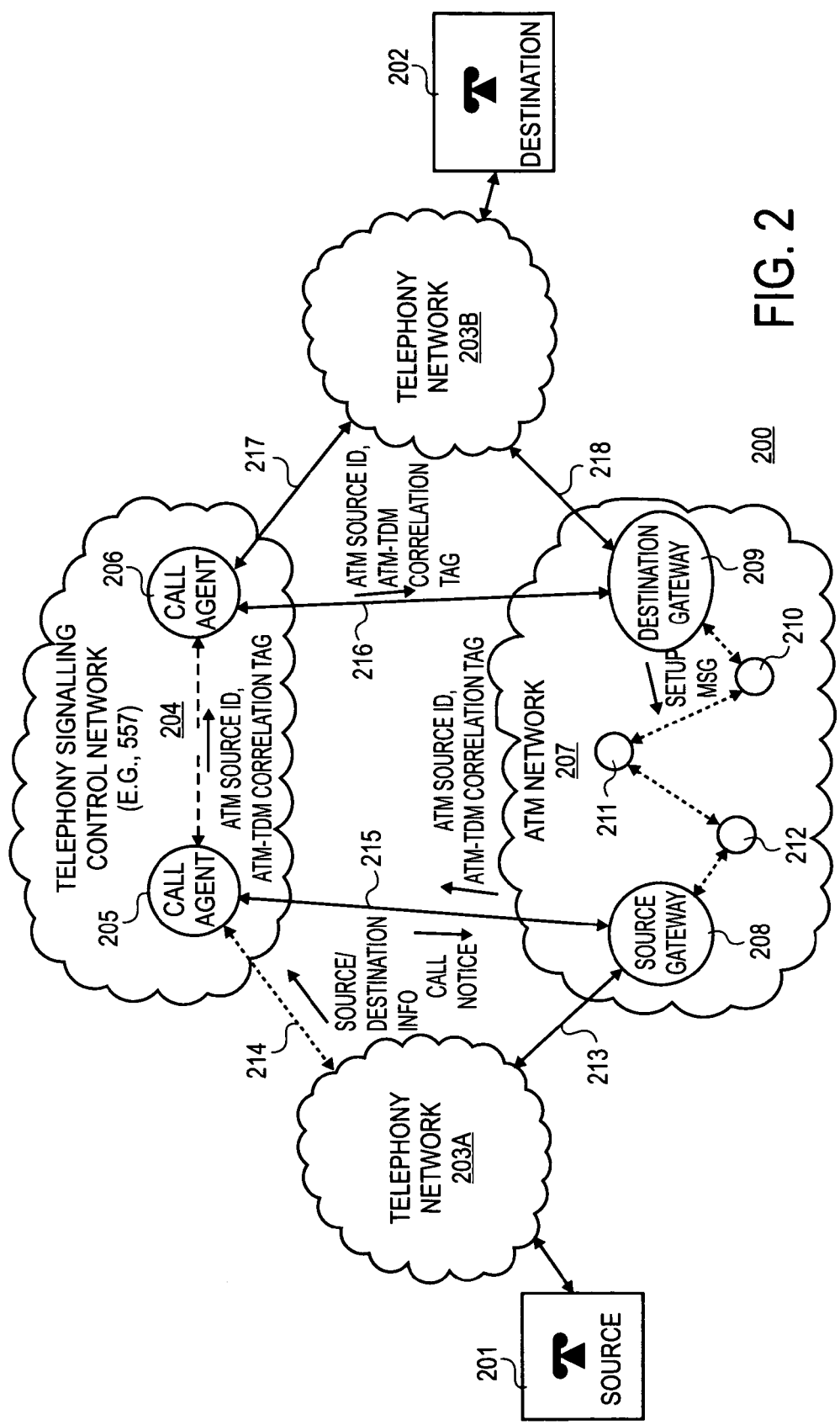
FIG. 2 shows a call agent based telephony signaling control network that uses traditional SS7 signaling and an ATM network.

FIG. 2 shows a solution to the problem described in the background. In the approach of FIG. 2, an ATM network 207 is used as a "backbone" to carry (e.g., over long distances) telephony traffic between two telephony networks 203a, 203b. Because ATM employs cell switching technology, ATM efficiently transports both voice traffic and data traffic. As such, a service provider may be inclined to deploy ATM technology.

However, uses of a traditional telephony network may still be desirable. For example, to extend the original investment made in their own TDM equipment, customers of a service provider may decide to communicate to the service provider through a traditional telephony network 203a, 203b. In other cases, traditional telephony networks may be suitable because the transportation of data traffic to a particular region or customer is insignificant. Note that, in any of these cases, traditional telephony networks 203a, 203b may correspond to networks operated by the service provider or a customer of the service provider or a combination of both.

In an embodiment, the ATM network 207 may approximately correspond to a wide area network (WAN) that carries traffic over longer distances while telephony networks 203a, b may approximately correspond to local networks that carry traffic over shorter distances (e.g., such as local exchange (LE) network or customer premise network). The network architecture 200 of FIG. 2 indicates that traffic between a first and second telephony network 203a, 203b is carried by an ATM network 207.

That is, for example, if a call is made from a source device 201 to a destination device 202 (where the source device 201 is communicatively coupled to a first telephony network 203a and the destination device 202 is communicatively coupled to a second telephony network 203b), the call is routed from the first telephony network 203a through the ATM network 207 and then from the ATM network 207 to the second telephony network 203b. In this manner, the transportation of the call is transparently carried as ATM traffic even though the source and destination devices 201, 202 employ traditional telephony network transportation techniques.

Figure 1:
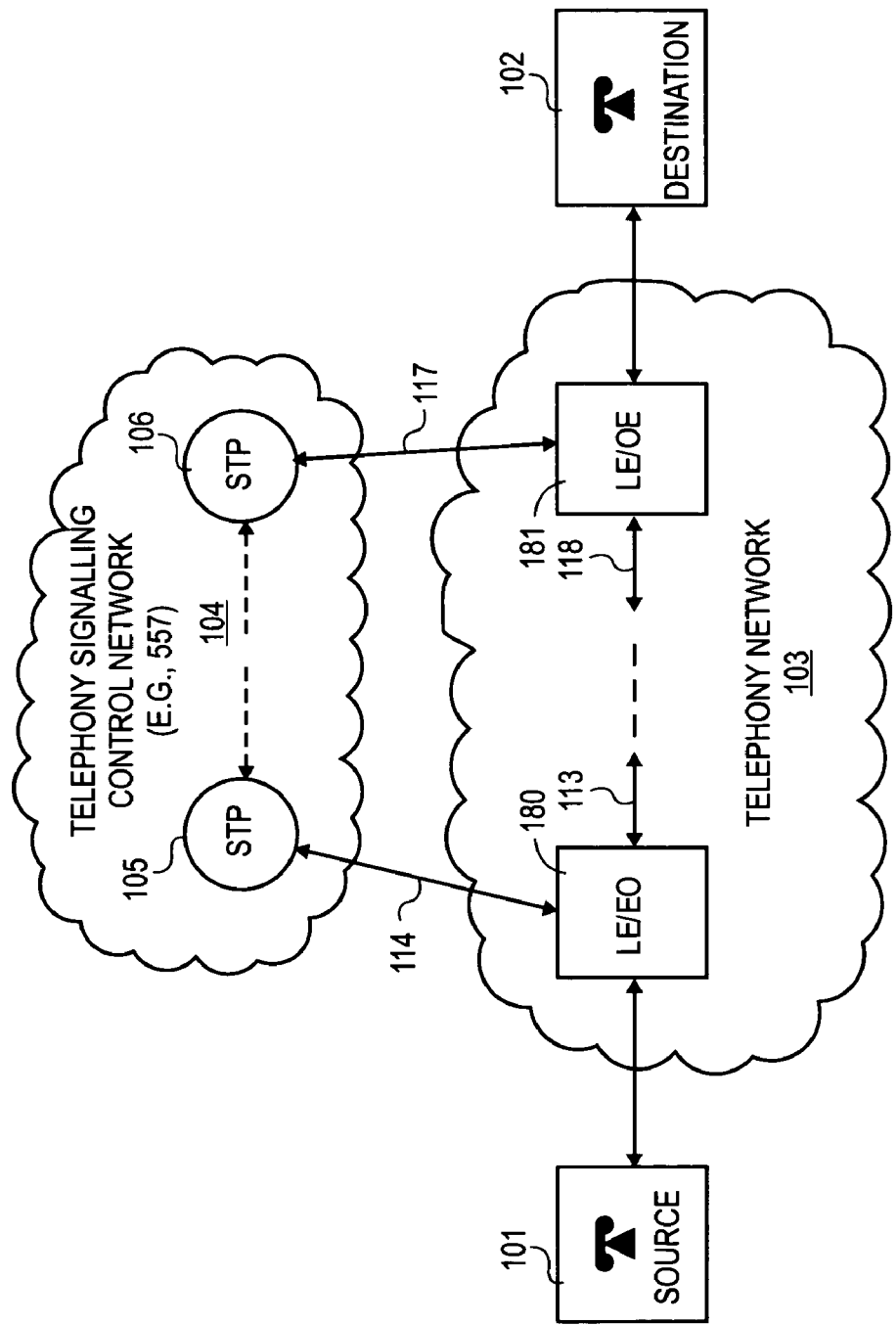
FIG. 1 shows a traditional telephony network and telephony signaling control network.

In a basic case, telephony network 203a may correspond to a source LE/EO (such as source LE/EO 180 of FIG. 1) and telephony network 203b may correspond to a destination LE/EO (such as destination LE/EO 181 of FIG. 1). In this case, trunk lines 213, 218 may respectively correspond to trunk lines 113, 118 (e.g., T1 lines) in the sense that they carry the call from the source and destination LE/EOs 180, 181 to deeper regions of the network. It is important to note, however, that telephony networks 203a, 203b may be comprised of any equipment used to implement a telephony network. As such, trunk lines 113, 118 are not necessarily tied to an LE or OE.

The approach associated with FIG. 2 integrates the connection establishment capabilities of both the ATM network 207 and the telephony signaling control network 204 so that an end-to-end connection from the source device 201 to the destination device 202 may be realized. In order to realize such a connection, as described in more detail below, information is exchanged between the ATM network 207 and the telephony signaling control network 204.

Recall from the discussion in the background concerning FIG. 1 that if a source device 101 attempts to call a destination device 102, information indicative of the source and destination devices is typically forwarded to source STP 105. Referring to FIG. 2, a similar procedure may be applied.

That is, communication interface 214 may correspond to communication interface 114. As such, when the source device 201 initiates a call to the destination device 202, information indicative of the source and destination devices (e.g., an IAM message, an ISDN setup message, an MGCP notification message) is forwarded over communication interface 214 from the first telephony network 203a to a telephony signaling control network 204.

Note that the communication interface 214 may be one of many different means used for communicating telephony signaling information between a telephony network 203a and a telephony signaling control network 204. Such means may include (but are not limited to including): SS7 Integrated Services digital network User Part (ISUP) signaling, the Media Gateway Control Protocol (MGCP), the ITU h.248 protocol, MEGACO, and an SCTP or RUDP based backhaul of ISDN signaling, etc.

After the telephony signaling control network 204 receives information that is indicative of the source 201 and destination 202 devices for the particular call, the telephony signaling control network 204 helps establish the call path through the telephony network 203a that is coupled to the source device 201 by reserving appropriate resources and providing appropriate signaling. The telephony signaling control network 204 also decides that the call will be directed over a particular trunk line 213 that couples the telephony network 203a to the ATM network 207.

This decision may be based on trunk availability between telephony network 203 and ATM network 207 by routing algorithms that are executed in the telephony signaling control network. Each trunk line 213, 218 may also be implemented as a "trunk group" or a "multiplexed line" and, as such, may also be referred to as a "trunk group/multiplexed line".

When the telephony signaling control network 204 receives the source and destination information from the telephony network 203a, notification of the call (i.e., call notice) is sent from the telephony signaling control network 204 to a source gateway 208 within the ATM network 207. The call notification may include a description of the particular TDM time slot on trunk line 213 that will be used for the call. In cases where more than one trunk line 213 could apply, the call notice may also describe which particular trunk line will be used for the call.

An ATM source gateway 208 provides access to the ATM network 207 (via trunk line 213) for the telephony network 203a that is coupled to the source device 201. The interface 215 between the telephony signaling control network 204 and the ATM source gateway 208 may take various forms such as a gateway control protocol, a signaling backhaul protocol or a combination of the two. Examples of a gateway control protocol include (but are not necessarily limited to) MGCP, MEGACO and the ITU h.248 protocol. Examples of a signaling backhaul protocol include (but are not necessarily limited to) Stream Control Transmission Protocol (SCTP) and Reliable User Datagram Protocol (RUDP).

After the ATM source gateway 208 receives the call notice, it responds to the telephony signaling control network (e.g., in the form of an acknowledgement) with: 1) an ATM source id (e.g., information that reflects the position of the ATM source gateway 208 within the ATM network 207 such as the ATM address of the ATM source gateway 208); and 2) an ATM-TDM correlation tag (i.e., information that associates the ATM connection that will be used to transport the call with TDM parameters (e.g., trunk line and TDM time slot) that will be used to transport the call). Note that the ATM-TDM correlation tag may be a randomly generated number.

After the ATM source id and ATM-TDM correlation tag are received by the telephony signaling control network 207 (e.g., by call agent 205), both are sent from the telephony signaling control network 204 to an ATM destination gateway 209. The telephony signaling control network 204 also helps establish the remainder of the call path by reserving appropriate resources and providing appropriate signaling within telephony network 203b that is coupled to the destination device 202. Thus, information that is indicative as to which particular TDM time slot on trunk line 218 that is being reserved for the call is also sent along with the ATM source id and the ATM-TDM correlation tag from the telephony signaling control network 204 to the ATM destination gateway 209. An ATM destination gateway provides access to ATM network 207 for telephony network 203b.

A call agent, such as call agent 205 and call agent 206, are devices capable of communicating with multiple protocols that may be used to communicate with a telephony signaling control network 204. For example, typically, a call agent not only communicates according to traditional SS7 based signaling but also other communication protocols that may be used to interface with a telephony signaling control network (e.g., MGCP, ITUh.248, MEGACO etc.). Thus, for example, if interface 215 corresponds to an MGCP interface and if interface 214 corresponds to an SS7 based interface, a call agent may be used to understand the signaling associated with both interfaces.

An ATM destination gateway 209 provides access to the ATM network 207 (via trunk line 218) for the telephony network 203b that is coupled to the destination device 202. In an embodiment, as seen in FIG. 2, the ATM source id and ATM-TDM correlation tag are forwarded from a source call agent 205 to a destination call agent 206 within the telephony signaling control network 204. In a further embodiment, the ATM source id and ATM-TDM correlation tag are sent through the telephony signaling control network 204 within an IAM message.

The destination call agent 206 then forwards the ATM-TDM correlation tag and ATM source id to an ATM destination gateway 209 over communication interface 216. The destination call agent 206 also helps establish, over communication interface 217, the call in the telephony network 203b that is coupled to the destination device 202. As such, the destination call agent 206 also informs the ATM destination gateway 209 as to which TDM time slot on trunk line 218 is being reserved for the call. If more than one trunk line exists the telephony signaling control network 204 may also inform the ATM destination gateway 209 as to the proper trunk line to be used for the call.

Again, communication interface 216 may take various forms such as a gateway control protocol, a signaling backhaul protocol or a combination of the two. Examples of a gateway control protocol include (but are not necessarily limited to) MGCP, MEGACO and the ITU h.248 protocol. Examples of a signaling backhaul protocol include (but are not necessarily limited to) Stream Control Transmission Protocol (SCTP) and Reliable User Datagram Protocol (RUDP).

Also, communications interface 217 may be one of many different means used for communicating telephony signaling information between a telephony network 203b and a telephony signaling control network 204. Such means may include (but are not limited to including): SS7 Integrated Services digital network User Part (ISUP) signaling, the Media Gateway Control Protocol (MGCP), MEGACO, the ITU h.248 protocol, an SCTP or RUDP based backhaul of ISDN signaling, etc.

Upon receipt of the ATM-TDM correlation tag and ATM source id, the ATM destination gateway 209 initiates a switched virtual circuit (SVC) connection establishment sequence in which the ATM-TDM correlation tag is sent along with traditional switched virtual circuit (SVC) connection signaling from the ATM destination gateway 209 to the ATM source gateway 208.

An SVC connection may be established by sending a SETUP message from a connection destination within an ATM network (e.g., ATM destination gateway 209) to a connection source within an ATM network (e.g., ATM source gateway 208). The SETUP message typically propagates through the ATM network 207 by hopping at each node that will be used to carry the connection.

For example, referring to FIG. 2, if the connection is to be carried over nodes 212, 211, and 210, (which may be determined as a result of the execution of a routing algorithm) the SETUP message traverses each of these nodes. As a result of the SETUP message being sent, VPI/VCI information associated with the connection is updated into the mapping tables of each node used to support the connection.

In an embodiment, each SETUP message includes the aforementioned ATM-TDM correlation tag that was sent to the ATM destination gateway 209 by the telephony signaling control network 204. SETUP messages without an ATM-TDM correlation tag are known in the art. A SETUP message is partitioned into various fields (which are referred to as Information Elements (IEs), similar to the manner in which a packet header is organized. In one embodiment, the ATM-TDM correlation tag is placed within the Called Party Sub-Address IE of a SETUP message (e.g., anywhere in the later 19 octets of this field). In another embodiment the ATM-TDM correlation tag is placed within the Generic Identifier Transport (GIT) IE. In another embodiment the ATM-TDM correlation tag is placed within the Generic Application Transport (GAT) IE. In another embodiment, the ATM-TDM correlation tag is placed within the User to User IE. In another embodiment, the ATM-TDM correlation tag is placed within the Network Call Correlation Identifier (NCCI) IE. In another embodiment, the ATM-TDM correlation tag is placed within the Calling Party Sub Address IE. In another embodiment, the ATM-TDM correlation tag is placed within the Served User Generated Reference IE (SUGR). Alternate embodiments may place the ATM-TDM correlation tag in other regions of the SETUP message not listed above where such placement is consistent with applicable industry standards.

Eventually, a SETUP message will reach the ATM source gateway 208. The SETUP message received by the ATM source gateway 208 will include the ATM-TDM correlation tag. Thus, in a sense, after the ATM-TDM correlation tag was created by the ATM source gateway 208 it was "looped" through the telephony signaling network 204 and the ATM network 207. Recall that the telephony signaling control network 204 (as part of the call notice previously provided through communication interface 215) has already notified the ATM source gateway 208 as to which TDM time slot on trunk line 213 that the call will be carried over.

The ATM-TDM correlation tag is used by the ATM source gateway 208 to correlate the SETUP message with the particular TDM time slot on trunk line 213 that the call will be carried over. That is, recalling that the ATM source gateway 208 originally generated the ATM-TDM correlation tag in light of notification of the call, upon receipt of the ATM-TDM correlation tag within the SETUP message the ATM source gateway 208 can update its mapping tables (or similar information) so that the payload of cells sent from/to node 212 (having the appropriate VPI/VCI information for the connection) are transported to/from the trunk 213 and TDM time slot that was specified by the telephony signaling control network 204.

Associated with this update, consistent with ATM SVC call establishment sequencing, ATM source gateway 208 sends a CONNECT message to the ATM destination gateway 209 through the nodes used to transport the call (e.g., nodes 212, 211, 210 as seen in FIG. 2). After the CONNECT message has been received by the ATM destination gateway 209, an end to end connection between the source device 201 and the destination device 202 has been established.

Figure 3:
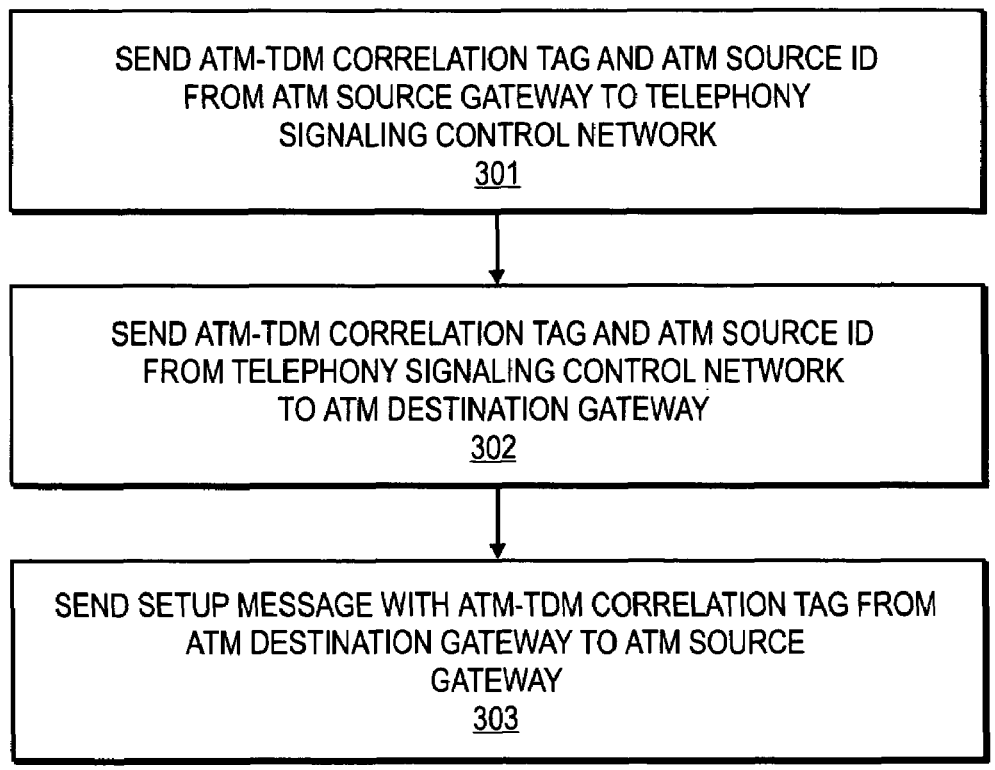
FIG. 3 shows a method for establishing a connection that transports traffic from a telephony network over an ATM network.

FIG. 3 shows a methodology that reviews, at a high level, the "looping" of the ATM-TDM correlation tag described above. Consistent with the description above, an ATM connection and ATM source id are sent 301 from an ATM source gateway to a telephony signaling control network. Then, the ATM-TDM correlation tag and ATM source id are sent 302 from the telephony signaling control network to an ATM destination gateway. Then, the ATM-TDM correlation tag is sent 303 within the ATM network, via a SETUP message, from the ATM destination gateway to the ATM source gateway.

It is important to point out that the techniques described above may be employed by any ATM network. Thus, these techniques may be employed not only by a purely cell switched ATM network but also by an ATM Adaptation Layer Type 2 (AAL2) packet network. In this case, an Establish Request (ERQ) message is used instead of a SETUP message and an Establish Confirm (ECF) message is used instead of a CONNECT message. Furthermore, rather than using VCI information, VCI/CID information is employed. ATM networks that comprise a combination of AAL2 packet and purely cell switched architectures may also use these techniques if appropriate translation of the SETUP/ERQ and CONNECT/ERF messages are provided as well as any needed bearer network conversions (e.g., from multiplexed to non-multiplexed cells).

It is also important to point out that the methodologies may be implemented at least partially with software. Thus it is to be understood that embodiments of this invention may be used as or to support software programs executed upon some form of processing core (such as a the CPU of a computer or an embedded microprocessor) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

What is claimed is:

1. A method, comprising:
   sending ATM source identification and an ATM-TDM correlation tag from an ATM source gateway to a telephony signaling control network;
   receiving at an ATM destination gateway said ATM source identification and said ATM-TDM correlation tag sent from said telephony signaling control network; and
   sending said ATM-TDM correlation tag from said ATM destination gateway to said ATM source gateway to establish a connection between said ATM destination gateway and said ATM source gateway;
   sending notification of a call from said telephony signaling control network to said ATM source gateway before said ATM source identification and said ATM-TDM correlation tag are sent to said telephony signaling control network, said notification further identifying which TDM time slot said call will be carried over, said TDM time slot on an trunk line that couples said ATM source gateway to a telephony network; and,
   after receiving said ATM-TDM correlation tag at said ATM source gateway, reflecting within a mapping table of said ATM source gateway that a VPI/VCI address received in a SETUP message with said ATM-TDM correlation tag corresponds to said TDM time slot.

2. The method of claim 1 wherein said ATM source gateway generates said ATM-TDM correlation tag in response to said notification.

3. The method of claim 2 wherein said ATM-TDM correlation tag is a random number.

4. The method of claim 1 wherein said notification identifies which trunk line said call will be carried over, said trunk line coupling said ATM source gateway to the telephony network.

5. The method of claim 1 wherein said sending said ATM-TDM correlation tag further comprises sending a SETUP message within an ATM network in a direction from said ATM destination gateway to said ATM source gateway.

6. The method of claim 5 further comprising sending a CONNECT message within said ATM network in a second direction from said ATM source gateway to said ATM destination gateway after said SETUP message has been received at said ATM source gateway.

7. The method of claim 1 wherein said sending said ATM-TDM correlation tag further comprises sending a ERQ message within an ATM network in a direction from said ATM destination gateway to said ATM source gateway.

8. The method of claim 7 further comprising sending a ECF message within said ATM network in a second direction from said ATM source gateway to said ATM destination gateway after said ERQ message has been received at said ATM source gateway.

9. The method of claim 1 further comprising sending, from said telephony signaling control network to said ATM destination gateway, which TDM time slot within the trunk line said call will be carried over, said trunk line coupling said ATM destination gateway to the telephony network.

10. The method of claim 9 further comprising updating a mapping table within said ATM destination gateway to reflect that a cell with a particular VPI/VCI corresponds to information carried over said TDM time slot.

11. The method of claim 9 further comprising updating a mapping table within said ATM destination gateway to reflect that a cell with a particular VPI/VCI corresponds to information carried over said TDM time slot.

12. The method of claim 1 further comprising sending, from said telephony signaling control network to said ATM destination gateway, which TDM time slot said call will be carried over.

13. A method, comprising:
sending ATM source identification and an ATM-TDM correlation tag from an ATM source gateway to a telephony signaling control network;
receiving at an ATM destination gateway said ATM source identification and said ATM-TDM correlation tag sent from said telephony signaling control network; and
sending said ATM-TDM correlation tag from said ATM destination gateway to said ATM source gateway to establish a connection between said ATM destination gateway and said ATM source gateway;
sending, from said telephony signaling control network to said ATM destination gateway, which TDM time slot within a trunk line a call will be carried over, said trunk line coupling said ATM destination gateway to a telephony network; and,
updating a mapping table within said ATM destination gateway to reflect that a cell with a particular VPI/VCI corresponds to information carried over said TDM time slot.

14. The method of claim 13 further comprising sending notification of the call from said telephony signaling control network to said ATM source gateway before said ATM source identification and said ATM-TDM correlation tag are sent to said telephony signaling control network, said notification further identifying which TDM time slot said call will be carried over, said TDM time slot on the trunk line that couples said ATM source gateway to the telephony network.

15. The method of claim 13 wherein said ATM source gateway generates said ATM-TDM correlation tag in response to said notification.

16. The method of claim 15 wherein said ATM-TDM correlation tag is a random number.

17. The method of claim 15 wherein said notification identifies which trunk line said call will be carried over, said trunk line coupling said ATM source gateway to the telephony network.

18. The method of claim 13 wherein said sending said ATM-TDM correlation tag further comprises sending a SETUP message within an ATM network in a direction from said ATM destination gateway to said ATM source gateway.

19. The method of claim 18 further comprising sending a CONNECT message within said ATM network in a second direction from said ATM source gateway to said ATM destination gateway after said SETUP message has been received at said ATM source gateway.

20. The method of claim 13 wherein said sending said ATM-TDM correlation tag further comprises sending a ERQ message within an ATM network in a direction from said ATM destination gateway to said ATM source gateway.

* * * * *